April 25, 1939.  H. C. PORTER  2,156,062
TENSIONING TOOL
Filed Nov. 20, 1937   3 Sheets-Sheet 1

Inventor:
Howard C. Porter
By Williams, Bradbury, McCaleb & Hinkle
Attys.

April 25, 1939.  H. C. PORTER  2,156,062
TENSIONING TOOL
Filed Nov. 20, 1937  3 Sheets-Sheet 2
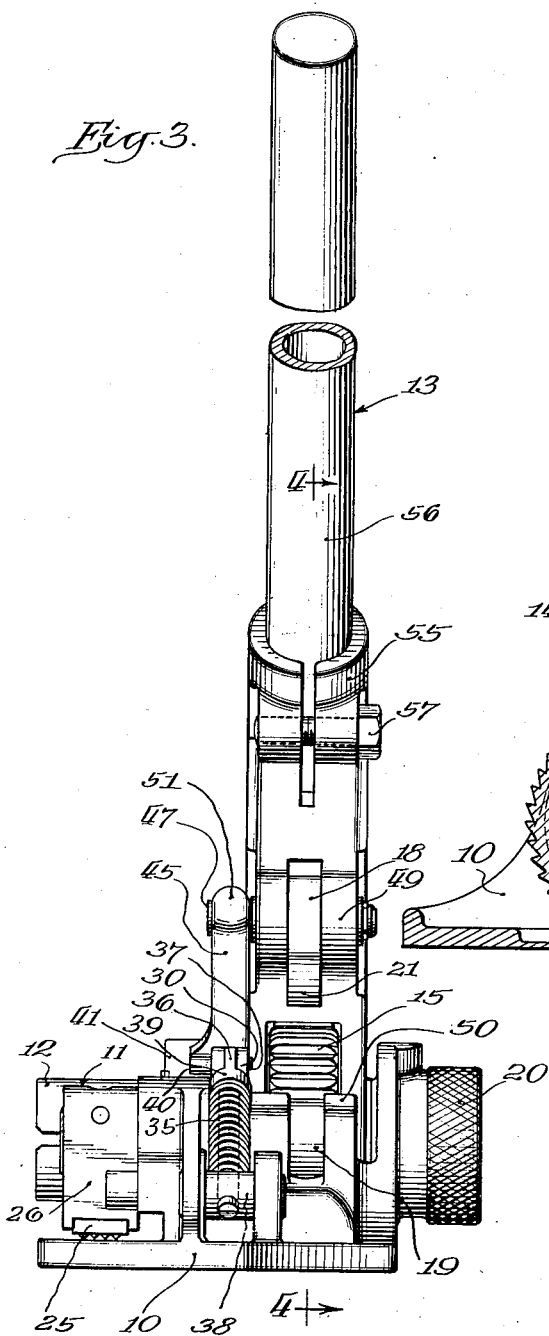
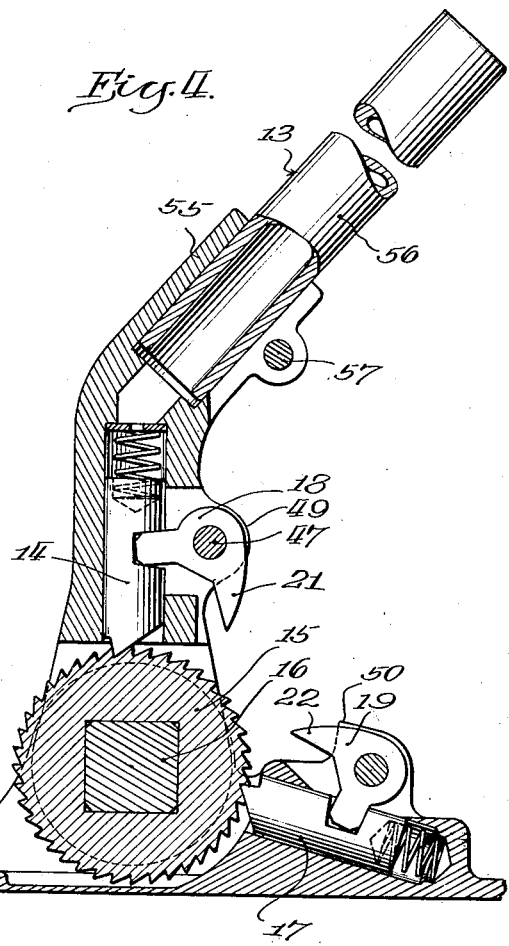
Inventor:
Howard C. Porter
By Williams, Bradbury, McCaleb & Hinkle
Attys.

April 25, 1939.                H. C. PORTER                 2,156,062
                               TENSIONING TOOL
                          Filed Nov. 20, 1937          3 Sheets-Sheet 3
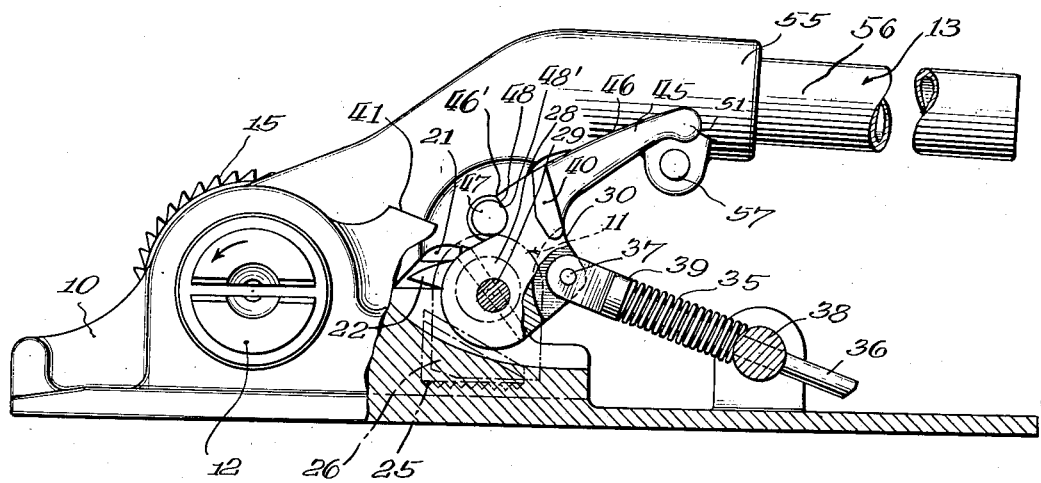
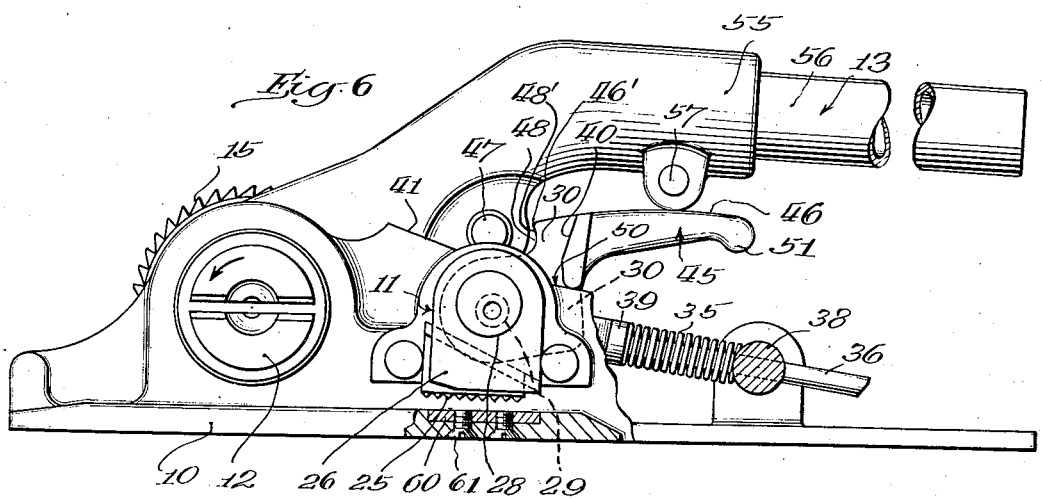
Inventor:
Howard C. Porter
By Williams, Bradbury, McCaleb & Hinkle
Attys.

Patented Apr. 25, 1939

2,156,062

UNITED STATES PATENT OFFICE 2,156,062

TENSIONING TOOL

Howard C. Porter, Chicago, Ill., assignor to Signode Steel Strapping Company, Chicago, Ill., a corporation of Delaware Application November 20, 1937, Serial No. 175,551

15 Claims. (Cl. 254—51)

My invention relates to tensioning—or what are commonly termed in the art "stretching"—tools, particularly adapted, although not limited, to use in the tightening of metallic strap-binder about packages and groups of packages.

One of the objects of the invention is to provide an improved tensioning or "stretching" tool.

Another object is to provide an improved tool wherein the gripper-anchor for one end of the binder may be automatically operated, by the handle that effects the tightening of the binder, to release and to grip the binder.

Another object is to provide a tool wherein the gripper-anchor and the tensioning handle automatically interlock so that, if desired, the gripper is held open and the tensioning handle is held stationary.

A further object is to provide a tool wherein the gripper, although operable by the tensioning handle, may, when desired, be actuated and held open independently of the tensioning handle.

Another object is to provide a tool wherein the gripper gradually and fully releases the binder before the release of the ratchets by which the tensioning handle tensions the binder.

Other objects of the invention will hereinafter appear.

The accompanying drawings illustrate the preferred embodiment of my invention incorporated in a binder-strap tensioning or "stretching" tool of the windlass type.

In the drawings:

Fig. 3 is a rear elevation;

Fig. 4 is a section on the line 4—4 of Fig. 3, with the gripper closed;

Fig. 5 is a side elevation, partly in section, with the gripper open and the tensioning handle and gripper release mechanism interlocked; and Fig. 6 is a side elevation, with the gripper open and the interlock disconnected.

Figure 1:
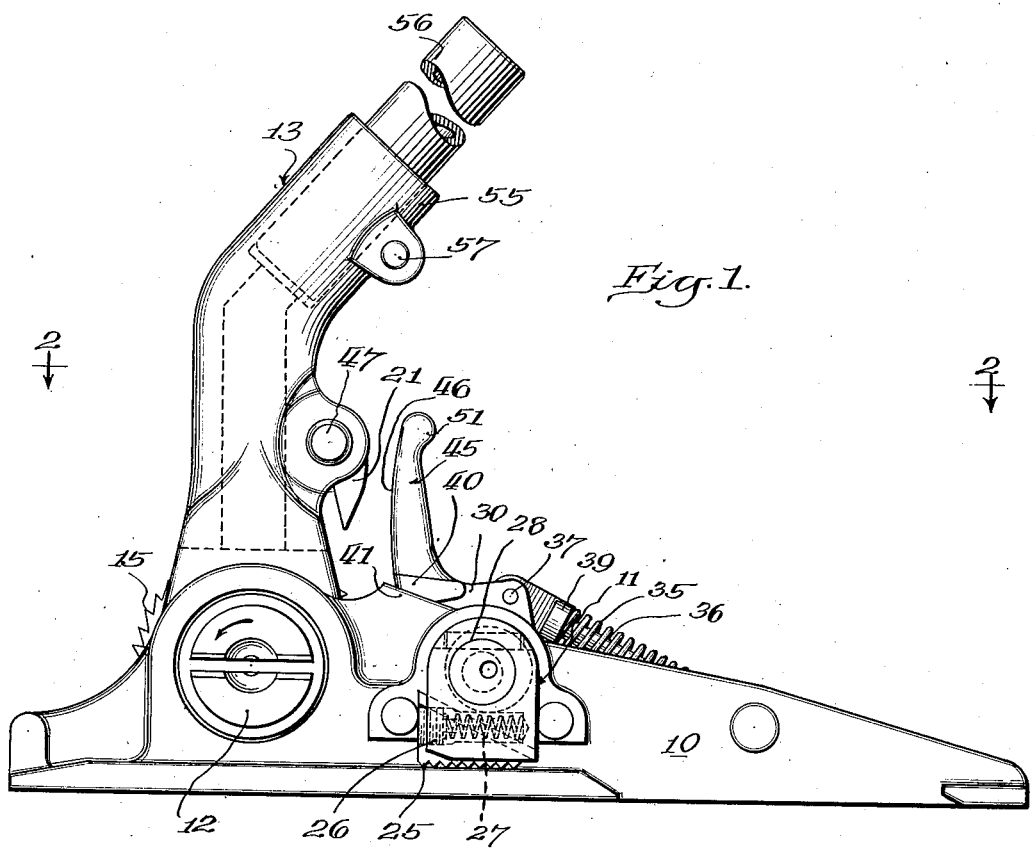
Fig. 1 is a side elevation of the windlass and gripper side of the tool, with the gripper closed in binder anchoring position.

In general, the tool comprises a frame 10, upon which are mounted a gripper 11 for anchoring one end of a binder, and a slotted windlass 12, upon which the other end of the binder may be wound to tension the same about a package or group of packages. The windlass is rotated by a tensioning handle 13, which rotates the windlass in the direction of the arrows by means of a spring pressed actuating pawl 14 acting upon a ratchet wheel 15 rigidly carried by the windlass shaft 16. A spring pressed holding pawl 17 acting upon ratchet wheel 15 serves to prevent reverse rotation of the windlass shaft.

As shown most clearly in Fig. 4, the actuating pawl 14 has a pivoted control lever 18, and the holding pawl 17 has a similar pivoted control lever 19. The windlass shaft has a knurled hand wheel or knob 20 rigidly secured thereto. Control lever 18 has a cam-shaped projection 21, and control lever 19 has a cam-shaped projection 22, which coact when the handle is moved to one extreme position, as shown in Figs. 5 and 6, to retract both pawls and release the windlass so that the pull thereof upon the binder is stopped and, if desired, it may be freely rotated in either direction by its knurled hand wheel 20.

The construction and operation of the binder tensioning mechanism thus far described is essentially the same as that disclosed in E. G. Seagren Patent No. 1,912,045, granted May 30, 1933.

Briefly, the operation is this: With the base of the tool frame resting upon the package or group of packages to be bound, one end of the binder is anchored by stationary gripper 11, then passed about the package, and its opposite end is attached to the windlass by insertion through the slot thereof. In this condition the binder may be tightly tensioned about the packages or group of packages by oscillating the tensioning handle 13. Whenever desired (e. g., at the end of the tensioning operation, or when it is convenient rapidly to wind the binder strap upon the windlass, or to turn the windlass so that the binder can be readily inserted in its slot), the actuating and holding pawls may be simultaneously retracted—and the windlass shaft released therefrom—by moving the tensioning handle into its extreme down position, as shown in Figs. 5 and 6, whereupon the coaction between the cam-shaped projections of the control levers 18 and 19 will withdraw the actuating and holding pawls from the windlass ratchet wheel.

The anchor-gripper for holding stationary one end of the binder is constructed and operates in essentially the same manner as the gripper disclosed in my Patent No. 1,917,663, granted July 11, 1933.

In general, the anchor-gripper comprises a wedge-shaped gripper block 25 which is carried in a correspondingly tapered slot of a vertically movable gripper-mounting block 26 in such a way that it may slide horizontally therethrough and be raised and lowered thereby. Preferably the lower surface of gripper-block 25 is toothed or serrated or otherwise roughened to increase its grip upon the binder-strap. A spring 27 seated in aligned holes or sockets formed in gripper-block 25 and its mounting block 26 biases the relatively movable gripper-block toward the left, as viewed in Figs. 1, 5 and 6. Gripper mounting block 26 is pivotally mounted upon an eccentric 28 of a shaft 29, which is suitably journaled in frame 10. Eccentric shaft 29 has an actuating lever 30 rigidly secured thereto.

Briefly, the operation of the anchor-gripper is as follows: When the gripper control lever 30 is moved in a clockwise direction to the position shown in Fig. 5, or the position shown in Fig. 6, the gripper is opened (i. e., the gripper block 25 is raised above the underlying foot which constitutes the stationary member of the gripper) so that the end of a binder-strap may be inserted laterally into the gap between the lower serrated face of the gripper block 25 and the underlying foot of the tool frame. With the strap located between the gripper block and the underlying foot, movement of the gripper control lever in the opposite or counterclockwise direction to the position shown in Fig. 1, results in the eccentricity of the gripper shaft causing the gripper-block to be moved downwardly to engage the top surface of the strap and tightly hold it by clamping it against the underlying foot of the tool. As tension is applied to the strap by the rotation of the windlass, the slight strap movement toward the right causes the wedge-shaped gripper block to move to the right and thereby, because of the corresponding taper in its supporting block, more tightly to wedge and firmly hold the strap as the tension therein increases. Moving the gripper control lever in a clockwise direction opens the gripper to release the strap and again condition the tool to receive another strap.

The tool is so constructed that the tensioning handle may be used automatically to open and close the gripper, the handle and gripper may be interlocked against movement and the handle and gripper may be actuated independently, as desired.

The gripper-mounting block 26 is normally biased downwardly to its closed or strap gripping position. This result is accomplished by a compression spring 35. Spring 35 surrounds a plunger 36 which at its inner end is pivoted to gripper control lever 30 by the pin 37 and at its other end is slidably supported by a guide 38, which is journaled in suitable bearings in the tool frame. Spring 35 lies between a shoulder 39 on plunger 36 and guide 38, so that unless lever 30 is moved to its extreme gripper-open position, as will be hereinafter explained, the gripper control lever 30 is urged or biased in a counterclockwise direction to assume the position shown in Figs. 1 and 2 with its stop shoulder 40 against a stop lug 41 on the frame. Of course, if a binder end is interposed between the gripper block 25 and the underlying foot of the tool, that binder end is clamped between the movable gripper block and the tool foot and anchored, as previously explained, and, because the interposed binder prevents gripper block 25 from striking the underlying foot, the biasing spring 35 cannot rotate the control lever 30 far enough to enable its stop shoulder 40 to engage stop lug 41.

Gripper control lever 30 has an extension trigger 45 whereby the gripper may be opened and permitted to close, either by the action of the tensioning handle or independently thereof as desired.

In order that the tensioning handle may control the action of the gripper, the outer end of trigger 45 is formed to provide an upper curved cam surface 46 engageable by a lug or pin 47 projecting laterally from handle 13. As I prefer to make the tool, this pin 47 constitutes also the pivot support for the actuating pawl control lever 18. The inner end of cam surface 46 terminates in a tip 46' which is formed by providing control lever 30 with a recess 48. This recess 48 has a curved bottom or inner end and its upper wall approaches tip 46' with a short straight surface 48' so that it may readily receive and retain and also release pin 47 in a manner and for a purpose to be presently explained.

Figure 2:
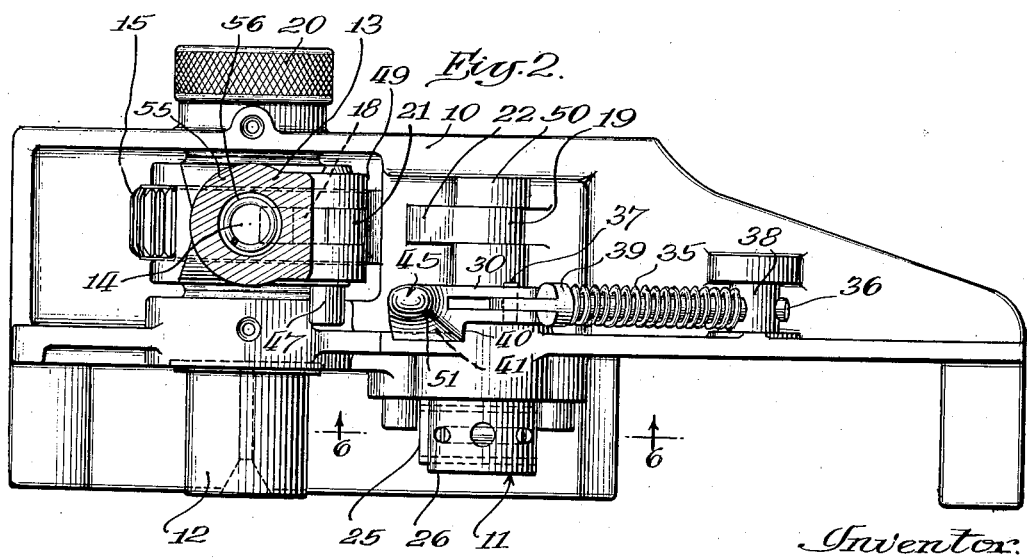
Fig. 2 is a top plan, with the tensioning handle in section on the line 2—2 of Fig. 1, so as not to obscure the underlying mechanism.

With the tool in tensioning condition, as shown in Fig. 1, handle 13 may be reciprocated through a considerable arc to rotate the windlass step by step, as previously described. When, however, the handle is moved further in a clockwise direction, its lug 47 engages the cam surface 46 of gripper control lever 30 and further movement in the same direction will rotate the control lever 30 in a clockwise direction against the tension of spring 35 to open the gripper. Continuation of this movement of the tensioning handle will progressively open the gripper until the pin 47 passes over the lower tip 46' of the cam surface 46, whereupon spring 35 will cause lever 30 to rotate slightly in a counter-clockwise direction, with the result that lug 47 will be partially embraced within the recess 48 and therewith form a latch which will detachably hold the handle and gripper control lever together (as shown in Fig. 5) with the gripper open and the tensioning handle lying in a position substantially parallel to and spaced above the base of the tool and with a stop shoulder 40 thereon being slightly above a stop lug 50 on the tool frame. In this condition (i. e., with the handle and the gripper control lever latched together) the tool may be conveniently carried from place to place and, with its gripper held open, readily applied in tensioning position relative to a package or group of packages and an encircling binder.

Preferably the underside of trigger 45 is so shaped and proportioned and provided with a knob 51, that it will provide a convenient hold or grip for a finger of the hand grasping the tensioning handle adjacent thereto and thereby, by the natural grip of the hand, prevent the latch between pin 47 and recess 48 from being inadvertently released to permit the gripper to close while the tool is being carried and positioned. When desired, however, the latch may be disconnected and the tensioning handle and gripper freed from each other (either by forcibly raising the handle to lift the latch pin 47 out of its socket 48 past the inclined surface 48' and tip 46', or by independently lowering the trigger 45 just far enough to cause tip 46' to clear pin 47), whereupon the gripper is released and forced by its spring 35 into closed position and the tensioning handle is free to be oscillated, as previously described, to rotate the windlass and thereby tension the binder.

As usually employed in the binding of packages and groups of packages, the end of the strap which is held by the stationary gripper is anchored thereby far enough from the extremity so that a portion lies along the foot of the tool and projects beyond the front (i. e., the left end, as viewed in Figs. 1, 2, 5 and 6, a sufficient distance to underlie a portion of the other strap end that leads to the windlass. Then when the desired tension in the encircling binder is attained, the overlapping portions thereof are united by a suitable joint. After the joint is made the tool may be released and removed in the following manner. Handle 13 is moved in a clockwise direction so that its pin 47 engages and rides along the cam surface 46 of gripper control trigger 45 and thus effects the raising of gripper mounting block 26 and gripper block 25 carried thereby, as previously described. As the gripper mounting block and gripper are lifted, the wedge-shaped gripper block is free to move toward the right, as viewed in Figs. 1, 5, and 6, as the elasticity of the taut strap behind it takes up on the slack in front of it and between it and the joint. Because of this freedom of the gripper block to move along with the strap, further raising of the gripper block lifts its teeth freely out of such strap indentations or recesses as they may have impressed therein while they were gripping the strap. Consequently, there is no tendency for the gripper teeth to mill and mar the strap or for any slight movement of the strap, when tension is released, to break or chip the tips of the gripper block teeth.

During the later stages in the clockwise movement of handle 13, the cam-shaped projection 21 of actuating pawl control lever 18 has been approaching the cam-shaped projection 22 on holding pawl control lever 19, and after the gripper is opened and while pin 47 is entering its recess 48 as previously described, these two cam surfaces engage each other and coact to withdraw the actuating and holding pawls from windlass ratchet wheel 15, freeing the windlass, as previously described. Thus, as the windlass actuating and holding pawls are withdrawn past the edges of the teeth of the ratchet wheel 15 there is, because the gripper has previously been released, no tension between the strap and the tool to tend to rotate the windlass in the reverse direction and thereby cause the teeth of the ratchet wheel to exert back pressure upon the pawls. In this manner the teeth of the windlass ratchet wheel and the tips of the actuating and holding pawls are protected against undue wear, chipping, and breakage.

When the handle has reached its substantially horizontal position where the windlass actuating and holding pawls have been completely withdrawn from the windlass ratchet wheel, and the gripper already having been released, the windlass is loose within the strap wound thereon during the tensioning operation and handle 13 may serve as a convenient lever to twist the tool sidewise so as to slip the foot thereof from under the strap and to slip the windlass head from within the strap coils thereabout.

The gripper may be opened and closed independently of the tensioning handle. Thus, by means of trigger 45, the gripper control lever 30 may be rotated against the tension of spring 35 to open the gripper and then may be released to permit spring 35 to close the gripper. If in opening the gripper, trigger 45 is moved far enough to bring its stop lug 40 against the frame stop 50 the centers of shafts 38 and 39 and the axis of plunger 36 are brought sufficiently near in line (i. e., close enough to dead center), to enable spring 35 to hold the gripper open as shown in Fig. 6. After being moved to this condition the gripper is held open until the operator raises trigger 45 far enough to move the center of pin 37 sufficiently above dead center to enable spring 35 to rotate gripper control lever 30 in a counter-clockwise direction and thereby force the gripper into closed position.

The tensioning handle of the tool may be constructed and formed in various ways. I prefer, however, to make the inner end as a bifurcated casting to straddle the windlass ratchet wheel and house the actuating pawl and provide it with a split curved socket 55 for receiving an extension 56 in the form of a piece of pipe. The extension may be held in its socket by a clamp screw 57. With the handle constructed in this manner, it may be readily arranged, when in its extreme clockwise position as shown in Figs. 5 and 6, to lie substantially parallel to and spaced sufficiently above the frame and the surface of the bundle on which the tool rests so as to prevent the operator from bruising his hand against the tool or the package being bound.

Preferably the fixed gripper in the foot of the tool is formed as a hardened steel insert 60 which is held in place in a recess in the tool foot by screws 61. The upper strap engaging surface of the insert is preferably made very smooth to allow free slippage of the strap thereover in the initial action of the fixed gripper so as to enable the wedge-shaped gripper block to move relative to the sloping wall of the slot in the gripper mounting block and thus bring about the increasing gripping action as the tension on the strap increases. Such an insert, which is readily removable for replacement, protects the foot of the tool against wear by the strap and permits renewal when one insert becomes worn.

Having thus illustrated and described the preferred embodiment of my invention, what I claim and desire to secure by United States Letters Patent is as follows:

1. A tensioning tool for flexible binders comprising a windlass upon which one end of the binder may be wound to tension the same; a gripper for anchoring the other end of the binder, said gripper being movable to a closed position to engage and hold the binder and to an open position to release and receive the binder; a gripper control for moving the gripper to open position; a tensioning handle for actuating the windlass; and an interlock between the gripper control and the tensioning handle whereby the tensioning handle may open the gripper and the gripper control will arrest movement of the tensioning handle.

2. A tensioning tool for flexible binders comprising a windlass upon which one end of a binder may be wound to tension the same; a tensioning handle which by reciprocation rotates the windlass in one direction to wind the binder thereon; a gripper for anchoring the other end of the binder, said gripper being movable to an open position to receive and release the binder and to a closed position to hold the binder; a gripper control mechanism for moving the gripper to open and to closed positions, the tensioning handle serving to operate the gripper control mechanism to open the gripper; and latch means for causing the gripper control mechanism to retain the tensioning handle in the position assumed when the gripper has been opened thereby.

3. A binder tensioning tool comprising a windlass upon which one end of the binder may be wound to tension the same; an actuating handle for the windlass; a gripper for anchoring the other end of the binder, said gripper being movable to an open position for receiving and releasing the binder and to a closed position for holding the binder; a lever for moving the gripper; means on the windless actuating handle for operating the gripper moving lever to open the gripper; and an interlock between the windless actuating handle and the gripper moving lever for retaining them together with the gripper open.

4. A binder tensioning tool comprising a windlass upon which one end of the binder may be wound to tension the same; an actuating handle for the windless; a gripper for anchoring the other end of the binder, said gripper being movable to an open position for receiving and releasing the binder and to a closed position for holding the binder; a lever for moving the gripper, means on the actuating handle for operating the gripper moving lever to open the gripper; and a latch on the gripper moving lever for detachably holding the actuating handle and gripper against movement.

5. A binder tensioning tool comprising a windlass upon which one end of the binder may be wound to tension the same; a tensioning handle; a ratchet interposed between the tensioning handle and the windlass whereby reciprocation of the tensioning handle rotates the windlass in one direction to wind the binder thereon; a gripper for anchoring the other end of the binder, said gripper being movable to an open position to release and receive the binder and to a closed position to grip and hold the binder; a gripper control lever biased by a spring to move the gripper to closed position and movable by the tensioning handle to open the gripper; and a latch between the tensioning handle and the gripper control lever detachably to hold them together with the gripper open.

6. A binder tensioning tool comprising a windlass upon which one end of the binder may be wound to tension the same; a tensioning handle; a ratchet interposed between the tensioning handle and the windlass whereby reciprocation of the tensioning handle rotates the windlass in one direction to wind the binder thereon; a gripper for anchoring the other end of the binder, said gripper being movable to an open position to release and receive the binder and to a closed position to grip and hold the binder; a gripper control lever biased by a spring to move the gripper to closed position and movable both by the tensioning handle and independently thereof to open the gripper; and a latch between the tensioning handle and the gripper control lever detachably to hold them together with the gripper open.

7. A binder tensioning tool comprising a windlass upon which one end of the binder may be wound to tension the same; an actuating handle for the windlass; ratchet mechanism interposed between the windlass and its actuating handle whereby reciprocation of the handle rotates the windlass in one direction to wind the binder thereon; a gripper movable to an open position to receive and release the other end of a binder and to a closed position to anchor the other end of the binder; a gripper control lever for moving the gripper to its various positions; a spring acting upon the gripper control lever to bias it to close the gripper, means associated with the actuating handle to operate upon the gripper control lever to open the gripper against the tension of said spring, and a latch to hold the actuating handle and gripper control lever together when the actuating handle is moved to open the gripper, said latch being disconnectable by movement of the actuating handle to release the gripper control lever and permit the spring to close the gripper.

8. A binder tensioning tool comprising a gripper movable to an open position to receive and to release the binder and to a closed position to anchor one end of the binder; tensioning mechanism for pulling on the other end of the binder; an actuating handle for the tensioning mechanism; gripper actuating mechanism operable by the tension mechanism actuating handle to open the gripper; and a latch connectable in one position of the actuating handle to hold the gripper open and disconnectable when the actuating handle is moved to another position to effect the closing of the gripper.

9. A binder tensioning tool comprising a gripper movable to an open position to receive and to release the binder and to a closed position to anchor one end of the binder; tensioning mechanism for pulling on the other end of the binder; gripper actuating mechanism operable selectively by and independently of the tensioning mechanism to open the gripper; and a latch between the gripper actuating mechanism and the tensioning mechanism to hold the gripper open when it is opened by the tensioning mechanism.

10. A binder tensioning tool comprising a gripper movable to a closed position to hold one end of the binder and to an open position to release and receive the end of the binder; tensioning mechanism for pulling on the other end of the binder; a tensioning handle for actuating the tensioning mechanism; gripper control mechanism for moving the gripper to open and closed positions, a spring normally tending to close the gripper except when the gripper has been opened beyond a certain amount and then tending to retain the gripper open; and detachable means associated with the tensioning handle and the gripper control mechanism whereby the tensioning handle may open the gripper and the gripper will be held open until said means are detached.

11. A binder tensioning tool comprising a windlass upon which one end of the binder may be wound to tension the same; a tensioning handle; disconnectible ratchet mechanism between the tensioning handle and the windlass whereby reciprocation of the handle in a predetermined arc of movement rotates the windlass step by step in the binder tensioning direction; a gripper for the other end of the binder, said gripper being movable to a closed position to anchor the other end of the binder and to an open position to release and receive the binder; and operative mechanism interposed between the tensioning handle and the gripper whereby the tensioning handle may control the opening and closing of the gripper and the gripper and tensioning handle may be interlocked in one position to hold the handle stationary and the gripper open.

12. A binder tensioning tool comprising a windlass upon which one end of the binder may be wound to tension the same; a tensioning handle; disconnectible ratchet mechanism between the tensioning hadle and the windlass whereby reciprocation of the handle in a predetermined arc of movement rotates the windlass step by step in the binder tensioning direction; a gripper for the other end of the binder, said gripper being movable to a closed position to anchor the other end of the binder and to an open position to release and receive the binder; a gripper-control lever for opening and closing the gripper, said tensioning handle in one of its movements cooperating with the gripper-control lever to effect the opening and closing of the gripper; and a disconnectible latch between the tensioning handle and the gripper-control lever for holding the gripper open.

13. A binder tensioning tool comprising a windlass upon which one end of the binder may be wound to tension the same; a tensioning handle; disconnectible ratchet mechanism between the tensioning handle and the windlass whereby reciprocation of the handle in a predetermined arc of movement rotates the windlass step by step in the binder tensioning direction; a gripper for the other end of the binder, said gripper being movable to a closed position to anchor the other end of the binder and to an open position to release and receive the binder; a gripper-control lever for opening and closing the gripper; a spring acting upon the gripper-control lever normally biasing the same to close the gripper but also serving when the gripper-control lever has been moved to an extreme position to hold the gripper open, the tensioning handle in one of its movements acting upon the gripper-control lever to effect the opening of the gripper and in another movement to effect the closing of the gripper, and the gripper-control lever being movable independently of the tensioning handle to open and close the gripper and a disconnectible latch between the tensioning handle and the gripper-control lever to hold the gripper open when it is opened by the tensioning handle.

14. A binder tensioning tool comprising means to exert a pull upon one end of the binder; a tensioning handle for actuating said means; a gripper for the other end of the binder, said gripper being movable to a closed position to anchor the binder and to an open position to release and receive the binder; and operative connections between the tensioning handle and the gripper whereby the tensioning handle may open the gripper and automatically hold the gripper open without being held by the operator.

15. A binder tensioning tool comprising a gripper movable to an open position to receive and to release a binder and to a closed position to anchor one end of the binder, means for pulling on the other end of the binder to tension the same, and mechanism which in one condition serves to actuate said means for pulling the binder, in another condition serves to control the opening and closing of the gripper, and in a third condition is disconnected from the means for pulling the binder.

HOWARD C. PORTER.